US012686035B2

(12) United States Patent
Sakata

(10) Patent No.: US 12,686,035 B2
(45) Date of Patent: Jul. 21, 2026

(54) CHEMICAL MECHANICAL POLISHER CLEANING UNIT

(71) Applicant: Applied Materials, Inc., Santa Clara, CA (US)

(72) Inventor: Clinton Sakata, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/750,685

(22) Filed: Jun. 21, 2024

(65) Prior Publication Data

US 2025/0387806 A1 Dec. 25, 2025

(51) Int. Cl.
*B08B 11/00* (2006.01)
*B08B 1/12* (2024.01)
*B08B 1/34* (2024.01)

(52) U.S. Cl.
CPC . *B08B 1/34* (2024.01); *B08B 1/12* (2024.01)

(58) Field of Classification Search
None
See application file for complete search history.

(56) References Cited

U.S. PATENT DOCUMENTS 6,752,162 B1 6/2004 Gardner et al.
9,711,381 B2 7/2017 Ko et al.
12,023,779 B2 7/2024 Lam
2006/0174510 A1 8/2006 Parks
2009/0031512 A1 2/2009 Sin et al.
2011/0079245 A1 4/2011 Karuppiah et al.
2013/0048018 A1 2/2013 Wargo et al.
2013/0111678 A1 5/2013 Chen et al.

FOREIGN PATENT DOCUMENTS

CN 218902817 U 4/2023
KR 20190128196 A * 11/2019 .......... C23C 16/042
KR 10-2023-0170434 A 12/2023

OTHER PUBLICATIONS

International Search Report and Written Opinion in related application PCT/US2025/033148 dated Oct. 13, 2025 9 pages.

* cited by examiner

*Primary Examiner* — Eric W Golightly
(74) *Attorney, Agent, or Firm* — Patterson + Sheridan, LLP

(57) ABSTRACT

A rotating substrate support for use in a substrate processing system includes a cylindrical shaped outer hub having a first end, a second end, a wall that extends from the first end to the second end, and a central opening formed through the wall. The wall includes an inner surface, an outer surface, and a flexible region. A circumferential groove is formed in the outer surface of the wall and within the flexible region and includes a gap that extends in a first direction. The inner surface of the wall defines at least a portion of an inner region of the cylindrical shaped outer hub. A first support plate is coupled to a first portion of the inner surface, and a second support plate coupled to a second portion of the inner surface. An expandable actuator is configured to change a size of the gap by adjusting a distance in the first direction between the second support plate and the first support plate.

7 Claims, 7 Drawing Sheets

CHEMICAL MECHANICAL POLISHER CLEANING UNIT

BACKGROUND

Field

Embodiments of the present invention generally relate to electronic device manufacturing, and in particular, to chemical mechanical polishing (CMP) systems and methods used in a semiconductor device manufacturing processes.

Description of the Related Art

During chemical mechanical polishing (CMP) processing, scattered particles, such as Cu, Ta, W, TaN, or Ti, may accumulate on both the front surface and back surface of a substrate. To properly remove the scattered particles, most post-CMP cleaning processes include physical cleaning as one of cleaning steps. Typically, the physical cleaning methods largely consist of physically removing excess metals with scrubbing brushes.

Post-CMP scrubbing brushes (i.e., scrubbers) remove particles by directly contacting the brush with the substrate surface. Typical scrubber assemblies consist of one brush on either side of the substrate surface. The brushes are spaced apart when the substrate is received or removed from the scrubbing assembly. The brushes are brought into contact with the substrate during cleaning.

The substrate is typically supported on a roller of the scrubbing assembly. In some examples, the substrate is supported in a vertical orientation on the roller. In some instances, the roller includes a gap for receiving the substrate in the vertical orientation. The size of the gap on the roller is fixed. One challenge encountered by the scrubbing assemblies is the thickness of the substrates is not always the same. As a result, the substrate can tilt or slip relative to the roller when the substrate is disposed in the gap.

There is, therefore, a need for a brush cleaning unit that can reduce slip and/or tilt of the substrate relative to the roller.

SUMMARY

In some embodiments, a rotating substrate support for use in a substrate processing system is provided. The substrate support includes a cylindrical shaped outer hub having a first end, a second end, a wall that extends from the first end to the second end, a central opening formed through the wall at the first end and the second end, and a central axis extending through a center of the central opening. The wall includes an inner surface, an outer surface, and a flexible region. A circumferential groove is formed in the outer surface of the wall and within the flexible region and includes a gap that extends in a first direction. The inner surface of the wall defines at least a portion of an inner region of the cylindrical shaped outer hub. A first support plate is coupled to a first portion of the inner surface of the wall, and a second support plate coupled to a second portion of the inner surface of the wall. An expandable actuator is configured to change a size of the gap of the circumferential groove by adjusting a distance in the first direction between the second support plate and the first support plate.

In some embodiments, a brush cleaning system for cleaning a substrate includes a tank and a first support and a second support coupled to the tank. The system also includes a first cylindrical roller coupled to the first support and a second cylindrical roller coupled to the second support. The first support and the second support are operable to move the first and second cylindrical rollers into contact with the substrate. A gripping roller is coupled to the tank, and the gripping roller has a groove for receiving the substrate. The system includes an expandable actuator for actuating the roller to grip or release the substrate in the groove.

In some embodiments, a system for polishing a substrate includes a plurality of polishing stations and a cleaning unit. The polishing stations include a polishing pad configured to polish the substrate. The cleaning unit includes a tank and a first support and a second support coupled to the tank. The cleaning unit also includes a first cylindrical roller coupled to the first support and a second cylindrical roller coupled to the second support. The first support and the second support are operable move the first and second cylindrical rollers into contact with the substrate. A gripping roller is coupled to the tank, and the gripping roller has a groove for receiving the substrate. The cleaning unit includes an expandable actuator for actuating the roller to grip or release the substrate in the groove. A transfer assembly is configured to transfer the substrate from one of the plurality of polishing stations to the cleaning unit.

In some embodiments, a method of cleaning a substrate includes positioning the substrate on a gripping roller in a brush cleaner. The substrate is gripped by contracting the gripping roller of the brush cleaner. After being gripped, the substrate is cleaned. After cleaning, the substrate is released by expanding the gripping roller.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments of the present disclosure and are therefore not to be considered limiting of its scope, as the present disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments herein generally relate to chemical mechanical polishing (CMP) systems, and in particular, to cleaning systems used with CMP systems and methods related thereto.

In one embodiment, a brush cleaning system for cleaning a substrate includes a tank and a first support and a second support coupled to the tank. The system also includes a first cylindrical roller coupled to the first support and a second cylindrical roller coupled to the second support. The first support and the second support are operable to move the first and second cylindrical rollers into contact with the substrate. A gripping roller is coupled to the tank, and the gripping roller has a groove for receiving the substrate. The system includes an expandable actuator for actuating the gripping roller to grip or release the substrate in the groove. The gripping roller is advantageously actuatable to support and grip substrates of different thicknesses. Also, the groove in the gripping roller is advantageously controllable to prevent slippage or to minimize tilt of the vertically positioned substrate.

Figure 1:
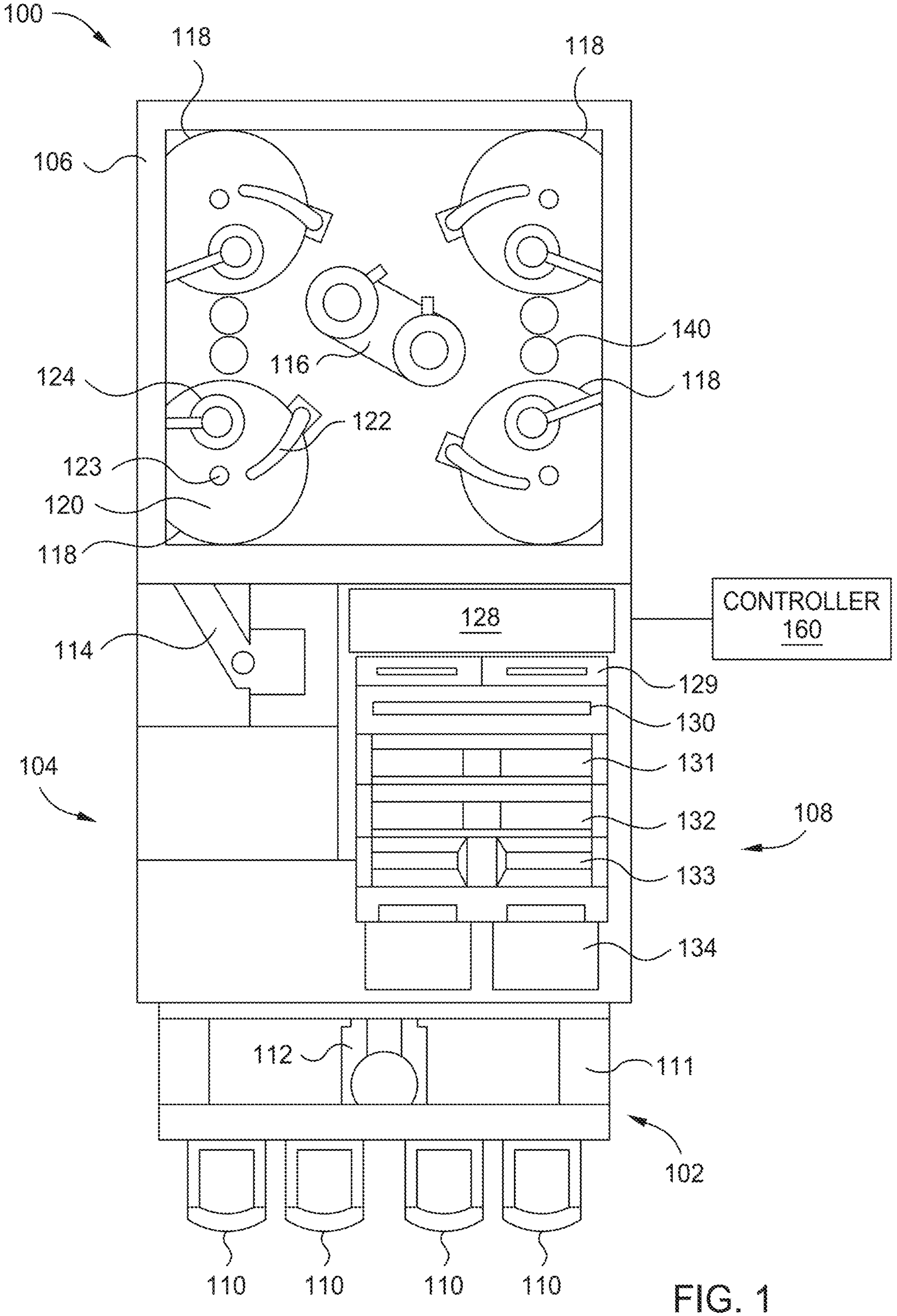
FIG. 1 is a schematic top view of a chemical mechanical polishing (CMP) system, according to certain embodiments.

FIG. 1 illustrates a schematic top view of a chemical mechanical polishing (CMP) system 100. The CMP system 100 generally includes a factory interface module 102, an input module 104, a polishing module 106, and a cleaning module 108. These four major components are generally disposed within the CMP system 100.

The factory interface module 102 includes a support to hold a plurality of cassettes 110, a housing 111 that encloses a chamber, and one or more interface robots 112. The interface robot 112 generally provides the range of motion required to transfer substrates between the cassettes 110 and one or more of the other modules of the CMP system 100.

Unprocessed substrates are generally transferred from the cassettes 110 to the input module 104 by the interface robot 112. The input module 104 generally facilitates transfer of a substrate between the interface robot 112 and a transfer robot 114. The transfer robot 114 transfers the substrate between the input module 104 and the polishing module 106.

The polishing module 106 generally comprises a transfer station 116, one or more polishing stations 118, and one or more non-contact cleaning units 140. The transfer station 116 is disposed within the polishing module 106 and is configured to accept the substrate from the transfer robot 114. The transfer station 116 transfers the substrate to at least one carrier head 124 of a polishing station 118 that retains the substrate during polishing.

The polishing stations 118 each includes a rotatable disk-shaped platen on which a polishing pad 120 is situated. The platen is operable to rotate about an axis. The polishing pad 120 can be a two-layer polishing pad with an outer polishing layer and a softer backing layer. The polishing stations 118 each further includes a dispensing arm 122, to dispense a polishing liquid, e.g., an abrasive slurry, onto the polishing pad 120. In the abrasive slurry, the abrasive particles can be silicon oxide, but some polishing processes use cerium oxide abrasive particles. Each polishing station 118 can also include a conditioner head 123 to maintain the polishing pad 120 at a consistent surface roughness.

The polishing stations 118 each includes at least one carrier head 124. The at least one carrier head 124 is operable to hold a substrate against the polishing pad 120 during a polishing operation. Following the polishing operation performed on a substrate, the at least one carrier head 124 transfers the substrate back to the transfer station 116.

The transfer robot 114 then removes the substrate from the polishing module 106 through an opening connecting the polishing module 106 with the remainder of the CMP system 100. The transfer robot 114 removes the substrate in a horizontal orientation from the polishing module 106 and transfers the substrate to the cleaning module 108.

The non-contact cleaning unit 140 may employ methods like megasonic cleaning or spray cleaning to eliminate particles and contaminants from the substrate surface. For example, the non-contact cleaning unit 140 may include megasonic cleaning, which utilizes high-frequency sound waves to create cavitation bubbles in the cleaning solution. The implosion of these bubbles generates shock waves that dislodge particles and contaminants from the substrate surface. Alternatively, the non-contact cleaning unit 140 may include spray cleaning, where high-pressure jets of cleaning solution are used to dislodge particles and contaminants. The non-contact cleaning unit 140 may be a single-arm spray cleaning module, employing a single spray arm moving back and forth across the substrate or a dual-arm spray cleaning module with two spray arms moving in opposite directions. Further, the non-contact cleaning unit 140 may be a rotating spray cleaning module that features a rotating spray head above the substrate, spraying cleaning solution from all angles. Additionally, the non-contact cleaning unit 140 may be an inline spray cleaning module integrated into the CMP process line, transporting the substrate on a conveyor belt and spraying it from multiple angles. Conversely, an off-line spray cleaning module operates independently, cleaning substrates outside the CMP process line, which may be loaded manually or with the transfer robot 114.

The cleaning module 108 generally includes one or more cleaning devices that can operate independently or in concert. For example, the cleaning module 108 can include, from top to bottom in FIG. 1, a resist removal module 128, an input module 129, one or more brush or buffing pad module 131, 132, a megasonic cleaner 133, and a drying module 134. Other possible cleaning devices include chemical spin cleaners and jet spray cleaners (not shown). A transport system, e.g., an overhead conveyor 130 that supports robot arms, can walk or run the substrate from cleaning device to cleaning device. The substrate is then transferred to the megasonic cleaner 133 in which high frequency vibrations produce controlled cavitation in a cleaning liquid to clean the substrate. Alternatively, the megasonic cleaner 133 can be positioned before the brush or buffing pad module 131, 132. A final rinse can be performed in a rinsing module before being transferred to the drying module 134.

The one or more brush or buffing pad module 131, 132, as described further below regarding FIGS. 2A-2C, directly contacts the substrate and may be a brush scrubbing module using a rotating brush to scrub the substrate surface. Briefly, the one or more brush or buffing pad module 131, 132 are devices in which the substrate can be placed and the surfaces of the substrate are contacted with rotating brushes or spinning buffing pads to remove any remaining particulates. In some embodiments, a brush moves back and forth across the substrate, applying cleaning solution during the scrubbing process. The rotating brush uses friction between the brush bristles and the substrate surface, as well as centrifugal force generated by the rotating brush to dislodge particles and contaminants from the substrate surface. The cleaning solution concurrently dissolves and weakens the bonds between particles and the substrate surface. Following dislodgment of contaminants from the substrate surface, the cleaning solution, flowing through the brush bristles, flushes the contaminants from the substrate surface.

The CMP system 100 includes a controller 160, which generally includes one or more processors, memory, and support circuits. The one or more processors may include a central processing unit (CPU) and may be one of any form of a general purpose processor that can be used in an industrial setting. The memory, or non-transitory computer-readable medium, is accessible by the one or more processors and may be one or more of memory such as random access memory (RAM), read only memory (ROM), floppy disk, hard disk, or any other form of digital storage, local or remote. The support circuits are coupled to the one or more processors and may comprise cache, clock circuits, input/output subsystems, power supplies, and the like. The various methods disclosed herein may generally be implemented under the control of the one or more processors by the one or more processors executing computer instruction code stored in the memory as, for example, a software routine. When the computer instruction code is executed by the one or more processors, the one or more processors controls the CMP system 100 to perform processes in accordance with the various methods disclosed herein.

Figure 2A:
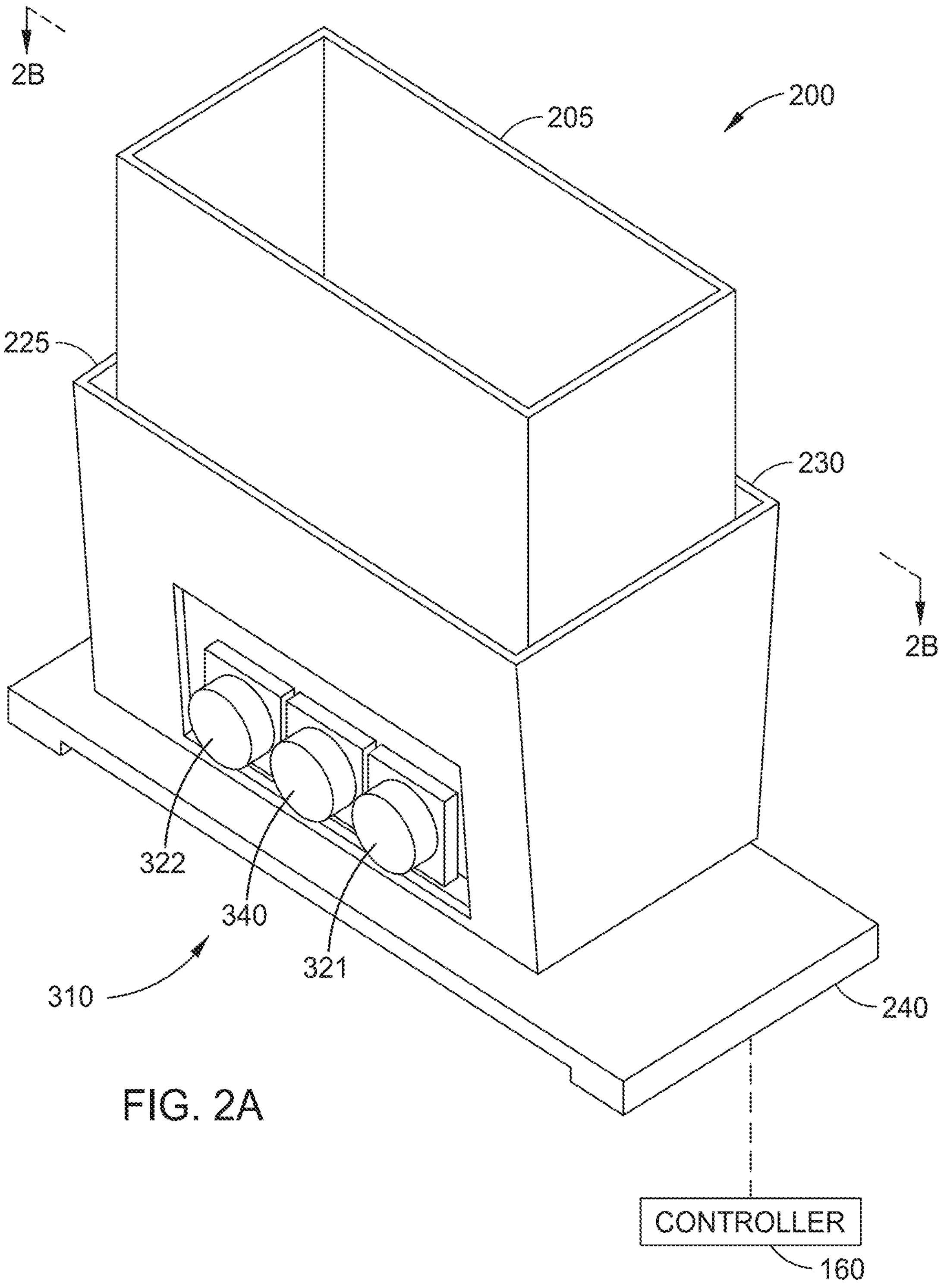
FIG. 2A is an isometric view of a contact cleaning unit which may be utilized in the CMP system of FIG. 1, according to certain embodiments.
Figure 2B:
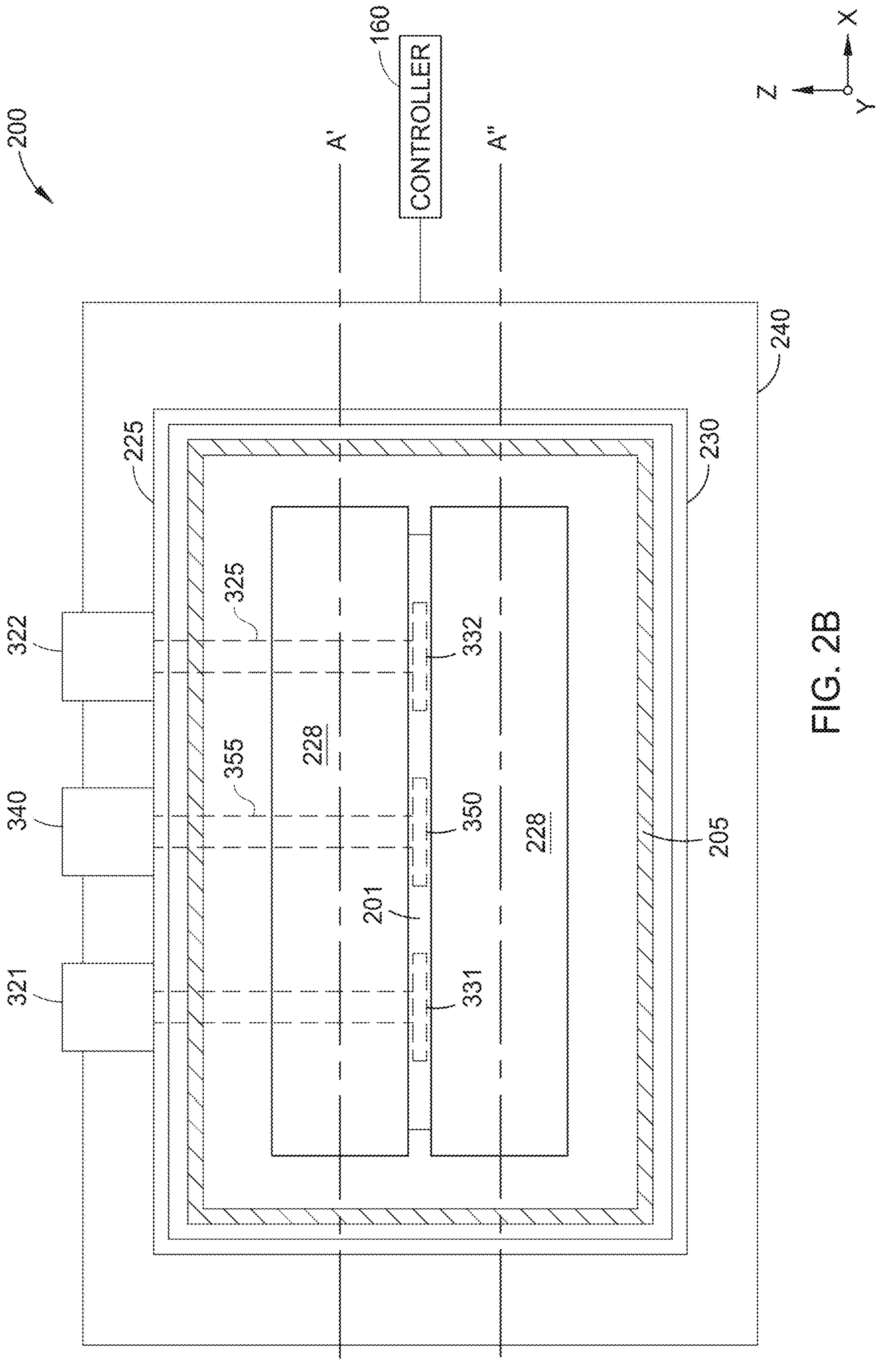
FIG. 2B is a top view of a brush cleaner in FIG. 2A, according to certain embodiments.
Figure 2C:
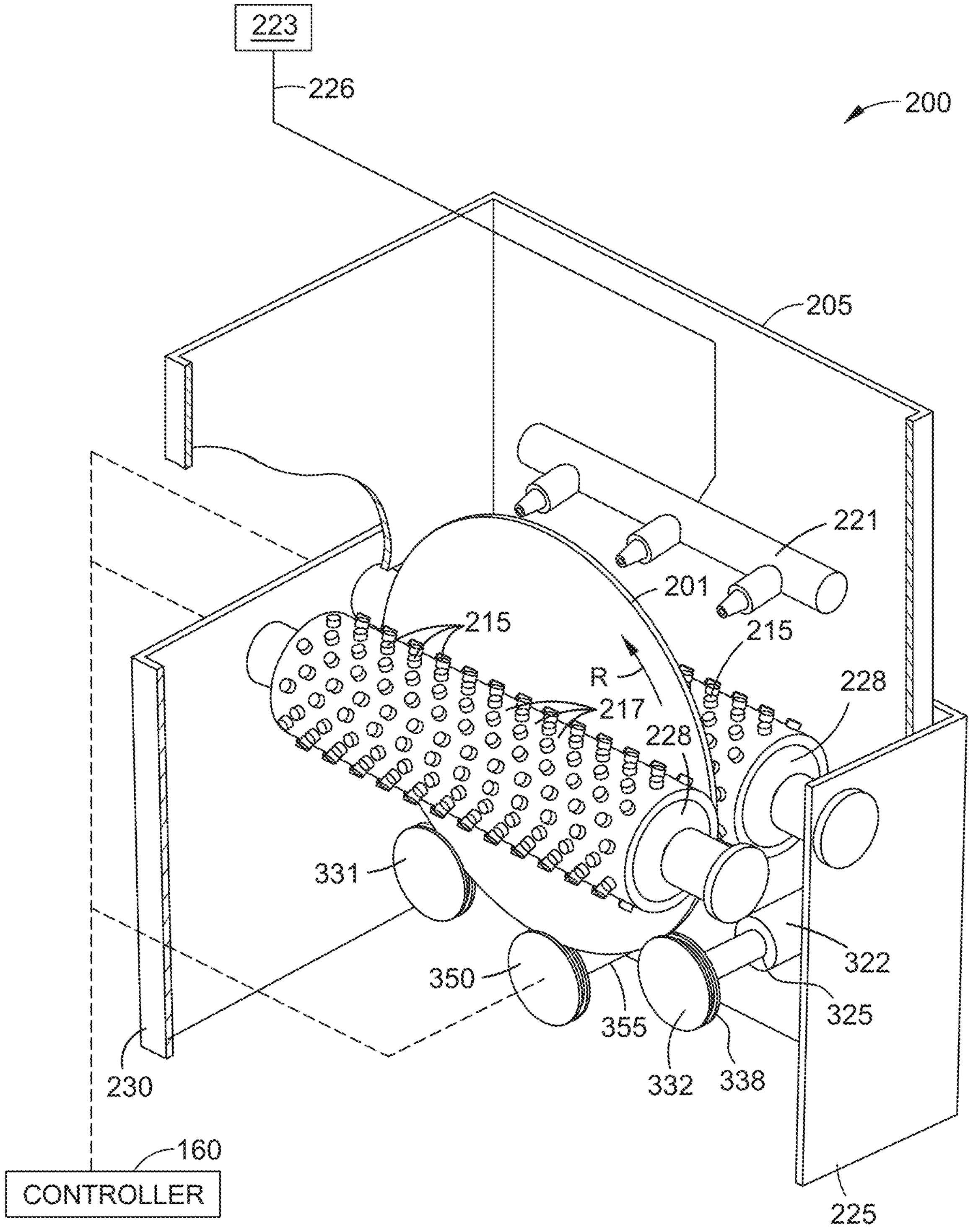
FIG. 2C is an isometric view of the brush cleaner of FIG. 2B, according to certain embodiments.

FIG. 2A is an isometric view of a brush cleaner 200, which may be utilized as one or more brush or buffing pad module 131, 132 in the CMP system 100 as described above. A lid portion of the brush cleaner 200, which includes a door, has been removed from FIGS. 2A-2C for ease of discussion. FIG. 2B is a top view of the brush cleaner 200 loaded with a substrate 201. FIG. 2C is an isometric view of the interior of the brush cleaner 200 showing the cylindrical rollers 228 in a processing position, in which the cylindrical rollers 228 are closed (e.g., pressed) against major surfaces of the substrate 201. The brush cleaner 200 shown in FIGS. 2A-2C can be a scrubber type brush box-type horizontal cleaner. The example brush cleaner 200 includes a tank 205 that is supported by a first support 225 and a second support 230. The first support 225 and the second support 230 are movably coupled to the base 240.

The brush cleaner 200 includes a plurality of scrubbing devices, such as at least a first and second cylindrical rollers 228, located inside the tank 205. In this example, a first cylindrical roller 228 is mounted to the first support 225, and a second cylindrical roller 228 is mounted to the second support 230. The first and second cylindrical rollers 228 may be coupled to actuators (not shown) for rotating the cylindrical rollers 228 about axes A' and A". The cylindrical rollers 228 are coupled to and controlled by the controller 160, which may control the rotational speed or rotational direction of the rollers 228. In one example, the first roller 228 is rotated in a clockwise direction, and the second roller 228 is rotated in a counterclockwise direction.

In operation, the first and second supports 225, 230 may be moved simultaneously relative to a base 240. Such movement may cause the first and second cylindrical rollers 228 to close against the substrate 201 as shown in FIG. 2C, or to cause the first and second cylindrical rollers 228 to be spaced apart to allow insertion and/or removal of the substrate 201 from the brush cleaner 200. In some embodiments, each cylindrical roller 228 includes a plurality of raised nodules 215 across its outer surface and a plurality of valleys 217 located among the nodules 215.

The brush cleaner 200 also include a substrate support system 310 adapted to support and rotate a substrate 201. In one embodiment, the substrate support system 310 includes one or more support rollers 331, 332 rotatable by one or more rotation actuators, such as drive motors 321, 322. As shown in FIGS. 2B and 2C, each support roller 331, 332 is disposed at the end of an output shaft 325 of a respective drive motor 321, 322. The support rollers 331, 332 are configured to support the substrate 201 and facilitate rotation of the substrate 201 about an axis that is perpendicular to the horizontal plane (i.e., X-Y plane). In one example, each of the support rollers 331, 332 include a groove 338 adapted to vertically support the substrate 201. Rotation of the support rollers 331, 332 causes rotation of the substrate 201. In some embodiments, the rollers 331, 332 are made from a plastic material or other polymeric material.

Figure 3:
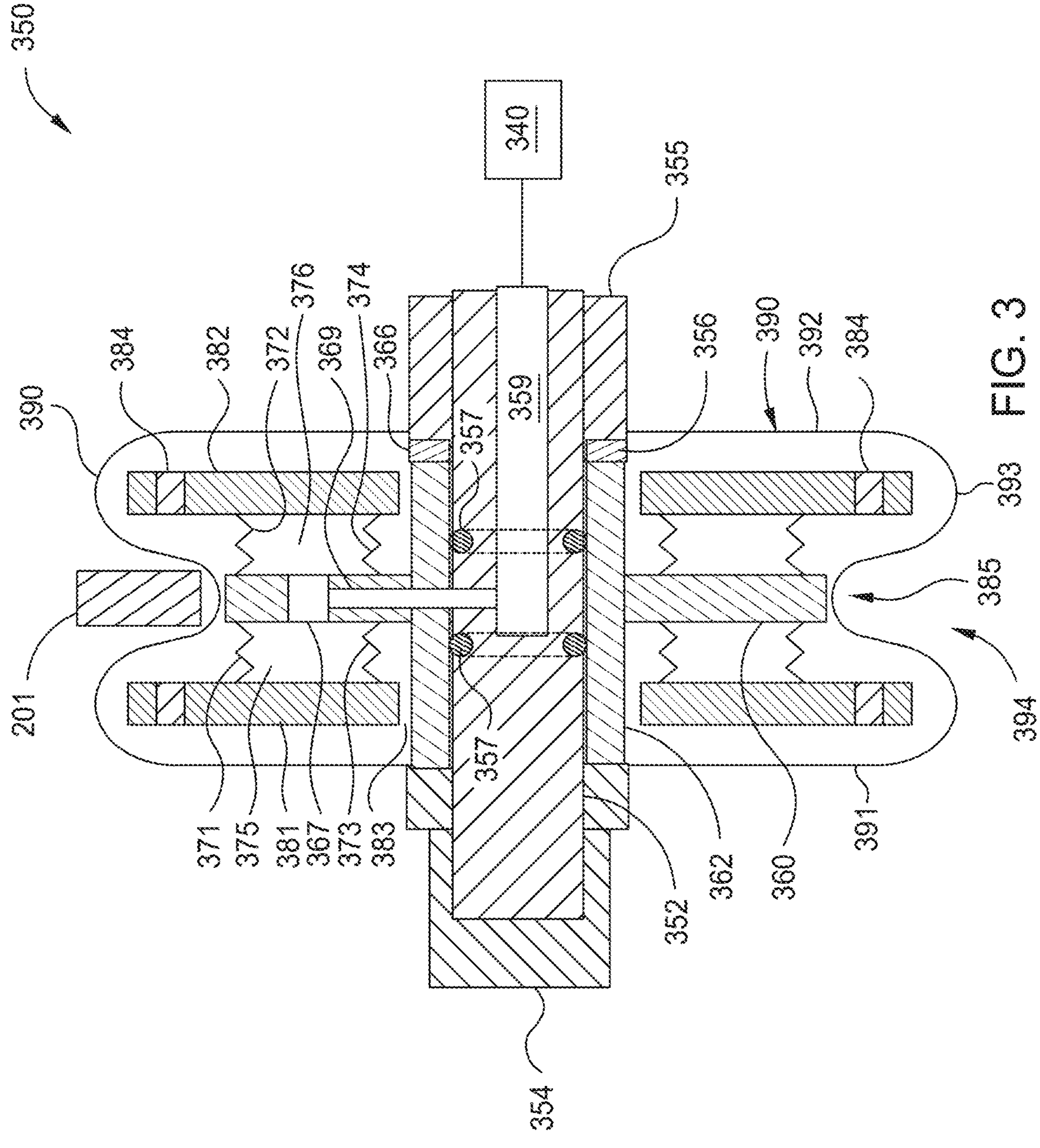
FIG. 3 is a schematic view of a gripping roller suitable for use with the cleaning unit of FIGS. 2A-2C, according to some embodiments. The gripping roller is shown in an open position.

The substrate support system 310 also includes one or more gripping rollers 350. FIG. 3 illustrates an exemplary embodiment of a gripping roller 350 suitable for use with the brush cleaner 200. The gripping roller 350 is configured to selectively grip the substrate 201. The gripping roller 350 includes a center disk 360 coupled to and rotatable with a rotating shaft 355. In this example, the center disk 360 is coupled to a distal end of the rotating shaft 355, and the proximal end of the rotating shaft 355 is rotatably coupled to the tank 205. In some examples, the center disk 360 is attached to a shaft coupling 362 and is coaxially aligned with the shaft coupling 362. The shaft coupling 362 comprises a tubular body having a bore extending through the tubular body. The distal end of the rotating shaft 355 has a smaller diameter portion 352 that is sized for insertion into the bore of the shaft coupling 362. A cap 354, such as a threaded nut, is attached to the distal end of the rotating shaft 355 to retain the shaft coupling 362 in position relative to the rotating shaft 355. The shaft coupling 362 is adapted to rotate with the rotating shaft 355. In one example, one end of the shaft coupling 362 includes one or more circumferentially spaced torque keys 366 that mate with complementary torque keys 356 on the rotating shaft 355 for transferring torque therebetween. In some embodiments, the rotating shaft 355 is adapted to passively rotate. In this respect, the rotating shaft 355 is rotated by the substrate 201, which is rotated by use of a drive motor 321, 322 coupled to the support rollers 331, 332. In some embodiments, the rotating shaft 355 is actively rotated by a drive motor coupled to the proximal end of the rotating shaft 355. The drive motor may be in communication with and operable by the controller 160. In some embodiments, one or more of the support rollers 331, 332 may be a gripping roller 350.

The gripping roller 350 includes an expandable actuator attached to each side of the center disk 360. Exemplary expandable actuators include a bellows or a diaphragm. As shown in FIG. 3, a first bellows 371 is attached to a first side of the center disk 360, and a second bellows 372 is attached to a second side of the center disk 360. In one example, the bellows 371, 372 have the same size. The bellows 371, 372 may be welded to the center disk 360. The bellows 371, 372 have an annular shape with a central opening disposed on an inner side of the annular shaped bellows 371, 372. The rotating shaft 355 and the shaft coupling 362 are disposed through the central opening of the bellows 371, 372.

Also, as shown in FIG. 3, a third bellows 373 is attached to the first side of the center disk 360, and a fourth bellows 374 is attached to the second side of the center disk 360. In one example, the bellows 373, 374 have the same size and are disposed in the central opening of the bellows 371, 372. The bellows 373, 374 may be welded to the center disk 360. The bellows 373, 374 have an annular shape with a central opening disposed on an inner side of the annular shaped bellows 373, 374. The rotating shaft 355 and the shaft coupling 362 are disposed through the central opening of the bellows 373, 374. A first internal bellows region 375 is formed between the outer side of the bellows 373 and the inner side of the bellows 371. A second internal bellows region 376 is formed between the outer side of the bellows 374 and the inner side of the bellows 372. The first and second internal bellows regions 375, 376 can be pressurized or evacuated, as will be discussed further below.

A first support plate 381 is attached to the side of the first bellows 371 and the third bellows 373 opposite the center disk 360. Similarly, a second support plate 382 is attached to the side of the second bellows 372 and the fourth bellows 374 opposite the center disk 360. The support plates 381, 382 have a flat, annular shape with a central opening. The rotating shaft 355 and the shaft coupling 362 are disposed through the central opening of the support plates 381, 382. As seen in FIG. 3, the central opening of the support plates 381, 382 have a larger diameter than the outer diameter of the shaft coupling 362 and the rotating shaft 355 such that a clearance 383 is formed. The clearance 383 facilitates axial movement of the support plates 381, 382 relative to the rotating shaft 355 during actuation of the gripping roller 350. In this example, the support plates 381, 382 have a larger diameter than the outer diameter of the center disk 360.

In one embodiment, a first internal bellows region 375 can be formed on a first side of the center disk 360 (e.g., left side in FIG. 3). The first internal bellows region 375 can be defined by the inner side of the bellows 371, the outer side of the bellows 373, a portion of the surfaces of the center disk 360 on the first side of the center disk 360 and between the bellows 371 and the bellows 373, and a portion of the support plate 381 disposed between the bellows 371 and the bellows 373. Similarly, a second internal bellows region 376 can be formed on a second side of the center disk 360 (e.g., right side in FIG. 3). The second internal bellows region 375 can be defined by the inner side of the bellows 372, the outer side of the bellows 374, a portion of the surfaces of the center disk 360 on the second side of the center disk 360 and between the bellows 372 and the bellows 374, and a portion of the support plate 382 disposed between the bellows 372 and the bellows 374.

An outer hub 390 is disposed around the exterior of the support plates 381, 382 and the center disk 360. In some embodiments, the outer hub 390 has a cylindrical shape and includes a first end 391, a second end 392, a wall 393 that extends from the first end 391 to the second end 392, and a central opening formed through the wall 393 at the first end 391 and the second end 392. A central axis of the outer hub 390 extends through a center of the central opening of the outer hub 390. The rotating shaft 355 and the shaft coupling 362 are disposed through the central opening of the hub 390. The wall 393 includes an inner surface, an outer surface, and a flexible region 394. A circumferential groove 385 is formed in the outer surface of the wall 393 and within the flexible region 394. The circumferential groove 385 comprises a gap that extends in a first direction from the first end 391 to the second end 392. As will be discussed further below, the groove 385 is aligned with the center disk 360 and is configured to selectively grip and/or release a substrate 201 by altering the pressure within the internal bellows regions 375, 376. In one example, the center disk 360 is aligned to the zero gap reference (e.g., the midpoint) of the two cylindrical rollers 228.

The inner surface of the wall 393 defines at least a portion of an inner region of the cylindrical shaped outer hub 390. The first support plate 381 is coupled to a first portion of the inner surface of the wall 393. The second support plate 382 is coupled to a second portion of the inner surface of the wall 393. The expandable actuator such as bellows 371-374 is configured to change a size of the gap of the circumferential groove 385 by adjusting a distance in the first direction between the first support plate 381 and the second support plate 382.

The outer hub 390 may be made of a flexible material, such as a polymeric, plastic, or other suitable material. Exemplary materials for the outer hub 390 include fluorine rubber such as FKM, perfluoroelastomers such as FFKM, polyurethane, or any other chemically compatible material which can be molded. The outer hub 390 may isolate the support plates 381, 382, the center disk 360, and the bellows 371, 372, 373, 374, which may include metallic components, from the process environment. In some embodiments, the support plates 381, 382 include one or more apertures 384 to facilitate attachment of the outer hub to the support plates 381, 382. In one example, each support plate 381, 382 has four circumferentially spaced apertures 384 (e.g., through holes) for coupling with a portion of the outer hub 390. The outer hub 390, the support plates 381, 382, the bellows 371, 372, 373, 374 are rotatable with the rotating shaft 355.

In some embodiments, the expandable actuators, such as bellows 371, 372, 373, 374, are actuated by evacuating the internal bellows regions 375, 376 or delivering a fluid, such as pneumatic fluid (e.g., air), to the internal bellows regions 375, 376. As shown FIG. 3, a first fluid path 359 in the rotating shaft 355 is connected to a second fluid path 369 and fluid port 367 in the center disk 360 provides fluid communication between a pneumatic fluid source 340 and the first and second internal bellows regions 375, 376 disposed between the bellows 371, 372 and the bellows 373, 374. Because the first and second internal bellows regions 375, 376 disposed on either side of the center disk 360 are in communication with the fluid paths 359, 369, the internal bellows regions 375, 376 have the same internal pressure, and therefore will undergo the same amount of expansion or contraction. A fluid seal 357, such as an o-ring, is disposed on each side of the second fluid path 369 and disposed between the shaft coupling 362 and the rotating shaft 355 to prevent leakage of pneumatic fluid out of the region formed therebetween or prevent leakage of the atmosphere into the region formed therebetween. In some embodiments, the fluid source 340 includes appropriate valves, such as a toggle valve, for controlling the flow of the pneumatic fluid to and from the fluid source 340. The fluid source 340 and the associated valves may be in communication with and operable by the controller 160. It is contemplated the expandable actuators, such as bellows 371, 372, 373, 374, may be actuated using hydraulic fluid, application of a vacuum, or electricity. In some embodiments, the pair of bellows 371, 373 and the pair of bellows 372, 374 may be independently actuated. For example, the pair of bellows 371, 373 can be actuated to move the first support plate 381 closer to the second support plate 382. In some embodiments, only one pair bellows is provided such that one of the support plates 381, 382 is expandable, and the other support plate 381, 382 is fixed (i.e., not coupled to a bellows 371, 372, 373, 374).

Figure 4:
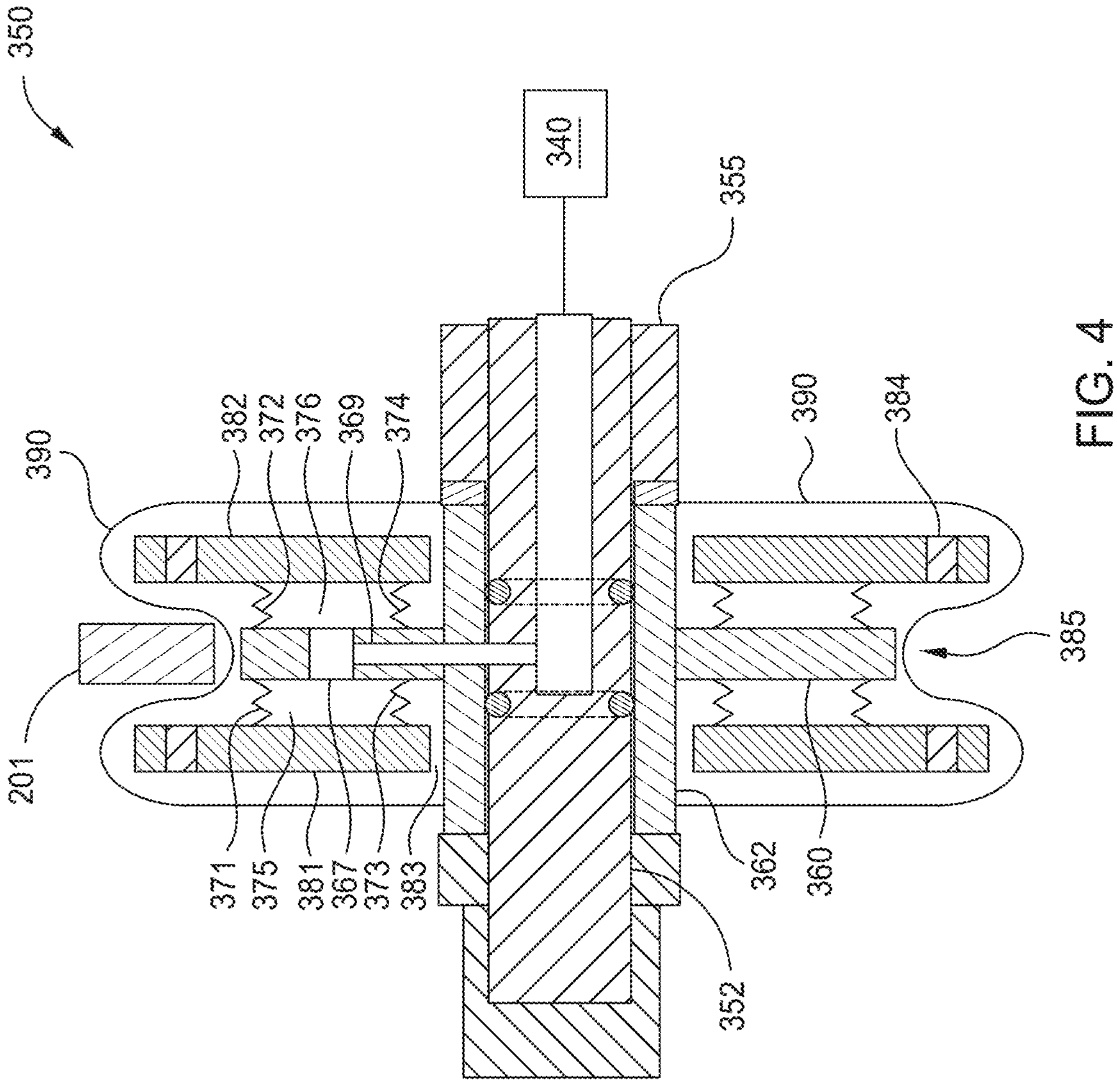
FIG. 4 is a schematic view of the gripping roller of FIG. 3 shown in a closed position.

In operation, the gripping roller 350 is actuatable to grip and release the substrate 201. In one example, the gripping roller 350 is actuated between an open position and a closed position. In the open position, the substrate 201 is allowed to be positioned in or removed from the groove 385. In the closed position, the substrate 201 is retained by surfaces of the groove 385. When a positive pressure is supplied from the pneumatic fluid source 340, the bellows 371, 372, 373, 374 will expand, thereby causing a distance between the support plates 381, 382 to expand, such as moving the support plates 381, 382 away from each other. In turn, expansion of the support plates 381, 382 causes the outer hub 390 to expand, thereby opening (e.g., widening) the groove 385 for receiving a substrate 201 or allowing a substrate 201 to be removed, as shown in FIG. 3. When pressure is withdrawn from the bellows 371, 372, 373, 374, the bellows 371, 372, 373, 374 will contract, thereby causing the distance between the support plates 381, 382 to contract, such as bringing the support plates 381, 382 closer to each other. In turn, contraction of the support plates 381, 382 causes the outer hub 390 to contract, thereby closing (e.g., narrowing) the groove 385 to grip the substrate 201, as shown in FIG. 4.

In an alternate configuration, when a negative pressure is supplied from the pneumatic fluid source 340, the bellows 371, 372, 373, 374 will contract, thereby causing the distance between the support plates 381, 382 to contract, such as moving the support plates 381, 382 towards each other. In turn, contraction of the support plates 381, 382 causes the outer hub 390 to contract, thereby closing (e.g., narrowing) the space within the groove for gripping the substrate 201 or allowing a substrate 201 to be held by the assembly. When a pressure is applied to the internal bellows regions 375, 376, the bellows 371, 372, 373, 374 will expand, thereby causing the distance between the support plates 381, 382 to expand, such as causing the support plates 381, 382 to move further apart. In turn, expansion of the support plates 381, 382 causes the outer hub 390 to expand, thereby opening (e.g., widening) the groove 385 so that a substrate 201 can be removed or received.

Referring back to FIGS. 2A-2C, the pair of cylindrical rollers 228 are supported by a pivotal mounting adapted to move the cylindrical rollers 228 into and out of contact with the substrate 201, such as a semiconductor wafer. During processing in the brush cleaner 200, the cylindrical rollers 228 are brought into contact with the substrate 201 while the cylindrical rollers 228 are rotated by the actuators (not shown). At the same time, the substrate 201 is rotated in the R direction by rotating the support rollers 331, 332, and the substrate 201 is gripped by the gripping roller 350, as shown in FIG. 2C. A cleaning fluid, such as deionized water and/or acid or base containing aqueous solution, is applied to the surface of the substrate 201 from a fluid source while the substrate 201 and cylindrical rollers 228 are rotated by the various actuators and motors.

The brush cleaner 200 may further comprise a plurality of sprayers 221 coupled to a source 223 of cleaning fluid via a supply pipe 226. The sprayers 221 are configured to dispense a high-pressure liquid spray onto the substrate surfaces, aiding in the removal of particles, contaminants, and residues. The sprayers 221 can incorporate various configurations, such as a fluid jet, spray bar with nozzles, shower-style spray manifold, or cryogenic aerosol jet.

In various embodiments of the present disclosure, the cleaning fluid utilized in the brush cleaner may include, but is not limited to deionized (DI) water, diluted citric acid, diluted Quaternary ammonium compound (a mixture of organic solvents, such as glycol ether, tetramethyl ammonium hydroxide, and other additives), diluted ammonium hydroxide ($NH_4OH$), diluted hydrogen peroxide ($H_2O_2$), $NH_4OH$ and $H_2O_2$ mixture (SC1), diluted hydrofluoric acid, sulfuric acid (H2SO4) and hydrogen peroxide ($H_2O_2$) mixture, Electra clean, or any other liquid solution used for substrate cleaning.

In one or more embodiments, the sprayers 221 may be positioned to spray a cleaning fluid at the surfaces of the substrate 201 or at the one or more cylindrical rollers 228 during a scrubbing process. In one or more embodiments, substrate cleaning fluid and/or brush cleaning fluid may be supplied from an internal region of the cylindrical rollers 228. Fluids provided to the interior of the cylindrical rollers 228 may clean the surface of the substrate 201 or remove debris found on the surface of the rollers 228.

Figure 5:
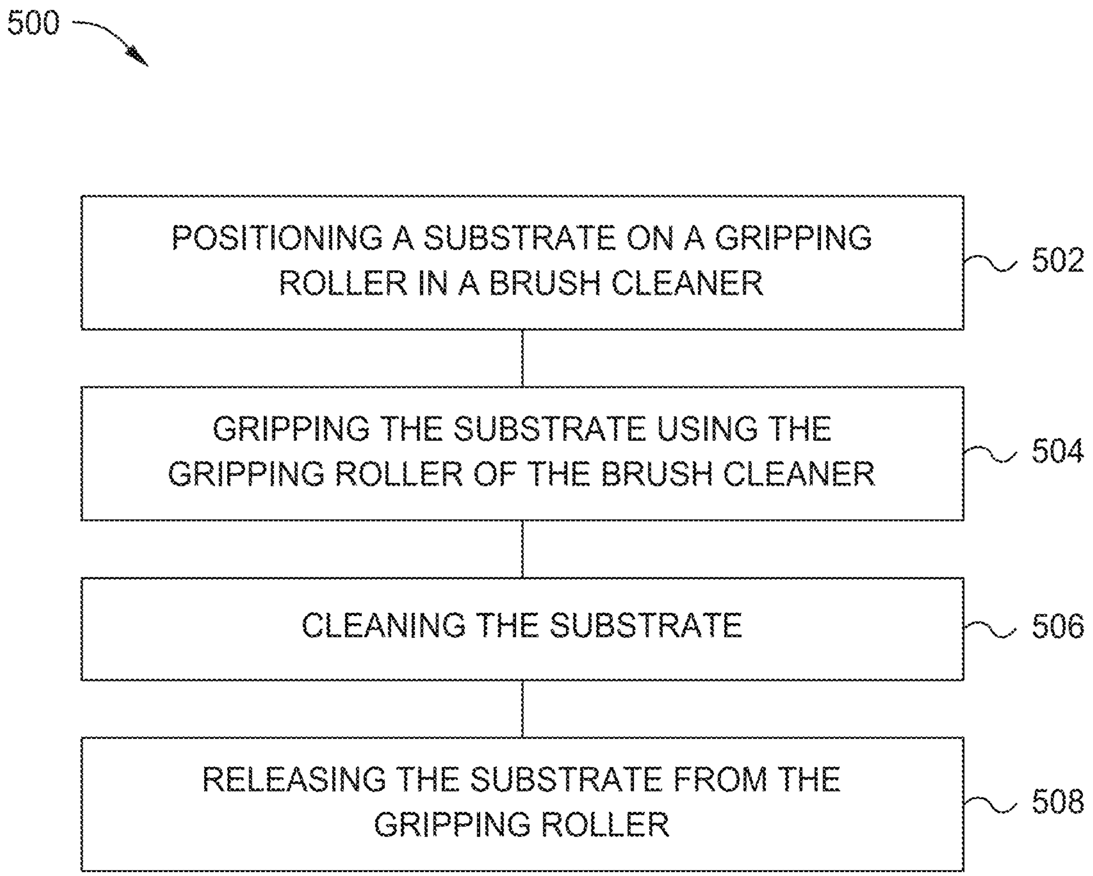
FIG. 5 illustrates a flow diagram of a method of cleaning a substrate, according to some embodiments.

FIG. 5 illustrates a flow diagram of a method 500 of cleaning a substrate, e.g., substrate 201, which may be performed by a controller of a CMP system, e.g., controller 160 of CMP system 100.

At operation 502, a substrate 201 is placed in a brush or buffing pad module 131, 132. For example, the brush or buffing pad module 131, 132 may be a brush cleaner 200. The substrate 201 is positioned vertically on the support rollers 331, 332 and the gripping roller 350 of the brush cleaner 200. In some embodiments, the substrate 201 is transferred to the brush cleaner 200 after being polished in a polishing station of the polishing stations 118.

At operation 504, the gripping roller 350 is actuated to grip the substrate 201. For example, power fluid is withdrawn from the bellows 371, 372 to cause the bellows 371, 372 to contract. In turn, the support plates 381, 382 are moved towards each other, thereby causing the outer hub 390 to contract. In this manner, the groove 385 is closed (e.g., narrowed) to cause a surface of the outer hub 390 to grip a surface of the substrate 201, as shown in FIG. 4. In some embodiments, the surface of the outer hub 390 is configured to contact, and or grip, an edge region of the substrate 201, such as an edge exclusion region found on opposing sides of the substrate 201. In some embodiments, the edge exclusion region is between about 0.5 millimeter (mm) and 3 mm from the outer edge of the substrate 201. In this respect, the substrate 201 is advantageously retained by the gripping roller 350 to prevent substrate slippage as the substrate 201 is rotate by the support rollers 331, 332 during processing. Also, the groove 385 is advantageously sized to minimize tilt of the vertically positioned substrate 201 when the substrate 201 is positioned in the groove 385 when the gripping roller 350 is positioned in an open position. In one example, the groove 385 is between 0.4 mm and 3 mm in size when it is in an open position.

At operation 506, the brush cleaner 200 cleans the substrate 201. In one example, the cylindrical rollers 228 are pressed against the major surfaces of the substrate 201. In some embodiments, at least one of the support rollers 331, 332 are rotated by a rotation actuator to cause rotation of the substrate 201. The gripping roller 350 applies sufficient pressure to the surface of the substrate 201 to grip the substrate 201 while allowing the substrate 201 to rotate about its central axis (e.g., axis normal to the major surfaces of the substrate 201). The cylindrical rollers 228 contacting the substrate 201 are also rotated during cleaning of the substrate 201. A cleaning fluid is applied to the surface of the substrate 201 as the cylindrical rollers 228 are rotated.

At operation 508, after cleaning, the substrate 201 is removed from the brush or buffing pad module 131, 132, e.g., the brush cleaner 200. In one example, during operation 508, a fluid is supplied to the internal bellows regions 375, 376 to cause the bellows 371, 372, 373, 374 to expand. In turn, the support plates 381, 382 are moved away from each other, thereby causing the outer hub 390 to expand. In this manner, the groove 385 is opened to release the substrate 201, as shown in FIG. 3.

In some embodiments, after cleaning, the substrate 201 is transferred to a polishing station of the polishing stations 118 for polishing or additional polishing if the substrate 201 was previously polished.

In some embodiments, after polishing, the substrate 201 is transferred to a non-contact cleaning unit, such as a megasonic cleaner 133 and/or a drying module 134. The non-contact cleaning unit then cleans the substrate 201 using a non-contact cleaning method, such as megasonic cleaning or spray cleaning. For example, the substrate 201 may undergo spray cleaning where high-pressure jets of cleaning solution are directed toward the substrate 201 to dislodge particles and contaminants. It is contemplated that the substrate 201 may be transferred to a second brush or buffing pad module 131, 132 instead of or in addition to the non-contact cleaning unit. In some embodiments, after cleaning, the substrate is transferred to the factory interface module 102 and cassettes 110.

When introducing elements of the present disclosure or exemplary aspects or embodiments thereof, the articles "a," "an," "the" and "said" are intended to mean that there are one or more of the elements.

The terms "comprising," "including" and "having" are intended to be inclusive and mean that there may be additional elements other than the listed elements.

The term "coupled" is used herein to refer to the direct or indirect coupling between two objects. For example, if object A physically touches object B and object B touches object C, the objects A and C may still be considered coupled to one another—even if objects A and C do not directly physically touch each other. For instance, a first object may be coupled to a second object even though the first object is never directly in physical contact with the second object.

While the foregoing is directed to embodiments of the present disclosure, other and further embodiments of the disclosure may be devised without departing from the basic scope thereof, and the scope thereof is determined by the claims that follow.

What is claimed is:

1. A rotating substrate support for use in a substrate processing system, the substrate support comprising:

a cylindrical shaped outer hub comprising a first end, a second end, a wall that extends from the first end to the second end, a central opening formed through the wall at the first end and the second end, and a central axis extending through a center of the central opening, wherein the wall comprises an inner surface, an outer surface, and a flexible region, a circumferential groove formed in the outer surface of the wall and within the flexible region, wherein the circumferential groove comprises a gap that extends in a first direction, and the inner surface of the wall forms at least a portion of an inner region of the cylindrical shaped outer hub;

a first support plate coupled to a first portion of the inner surface of the wall;

a second support plate coupled to a second portion of the inner surface of the wall; and an expandable actuator, wherein the expandable actuator is configured to change a size of the gap of the circumferential groove by adjusting a distance in the first direction between the second support plate and the first support plate.

2. The rotating substrate support of claim 1, further comprising a center disk disposed within the inner region, wherein the center disk comprises a center that is disposed on the central axis.

3. The rotating substrate support of claim 2, wherein the expandable actuator comprises:

a first pair of bellows having a first end and a second end, wherein the first end of the is coupled to the first support plate and the second end of the first pair is coupled to a first side of the center disk; and a first internal bellows region formed between the first pair of bellows.

4. The rotating substrate support of claim 3, wherein the expandable actuator further comprises:

a second pair of bellows having a first end and a second end, wherein the first end of the second pair is coupled to the second support plate and the second end of the second pair is coupled to a second side of the center disk; and a second internal bellows region formed between the second pair of bellows.

5. The rotating substrate support of claim 4, wherein the first internal bellows region is in fluid communication with the second internal bellows region.

6. The rotating substrate support of claim 2, further comprising a fluid delivery port formed in the center disk, wherein the fluid delivery port is in fluid communication with the expandable actuator and is configured to allow a fluid to pass therethrough to allow a pressure to be altered within the expandable actuator.

7. The rotating substrate support of claim 6, wherein altering the pressure within the expandable actuator changes the distance in the first direction between the second support plate and the first support plate.

* * * * *